United States Patent [19]

McGugan

[11] 4,298,221

[45] Nov. 3, 1981

[54] PIPE CONNECTORS

[75] Inventor: John D. McGugan, Banchory, Scotland

[73] Assignee: Hunting Oilfield Services (U.K.) Limited, Aberdeen, Scotland

[21] Appl. No.: 965,095

[22] Filed: Nov. 30, 1978

Related U.S. Application Data

[63] Continuation-in-part of Ser. No. 815,094, Jul. 13, 1977, abandoned.

[30] Foreign Application Priority Data

Jan. 26, 1977 [GB] United Kingdom ............... 3227/77
Mar. 1, 1977 [GB] United Kingdom ............... 8632/77
Nov. 10, 1978 [GB] United Kingdom ............ 44120/78

[51] Int. Cl.³ .............................................. F16L 25/00
[52] U.S. Cl. ................................. 285/328; 285/332.4; 285/381; 285/382; 285/DIG. 22
[58] Field of Search ................... 285/382, 328, 382.1, 285/399, 382.2, 381, 332.4, DIG. 22; 29/447, 453, 525; 403/273, 333, 334, 345

[56] References Cited

U.S. PATENT DOCUMENTS

| | | | |
|---|---|---|---|
| 1,004,270 | 9/1911 | Jahnke | 285/381 |
| 2,147,343 | 2/1939 | Hokanson | 285/332.4 X |
| 3,114,566 | 12/1966 | Coberly et al. | 285/381 X |
| 3,498,648 | 3/1970 | Hallesy | 285/382.2 X |
| 3,784,235 | 1/1974 | Kessler et al. | 285/DIG. 22 |
| 4,030,850 | 6/1977 | Hyde | 403/333 |

Primary Examiner—Dave W. Arola
Attorney, Agent, or Firm—Hane, Roberts, Spiecens & Cohen

[57] ABSTRACT

A pipe connector comprises a tubular pin member and a tubular box member which are telescopically engageable, the pin and box members having corresponding frusto-conical inner and outer peripheral surfaces respectively which peripheral surfaces are in contact when the members are engaged, the surfaces being provided with annular projection and groove means which are interengaged when the members are engaged to axially lock the members together.

12 Claims, 13 Drawing Figures

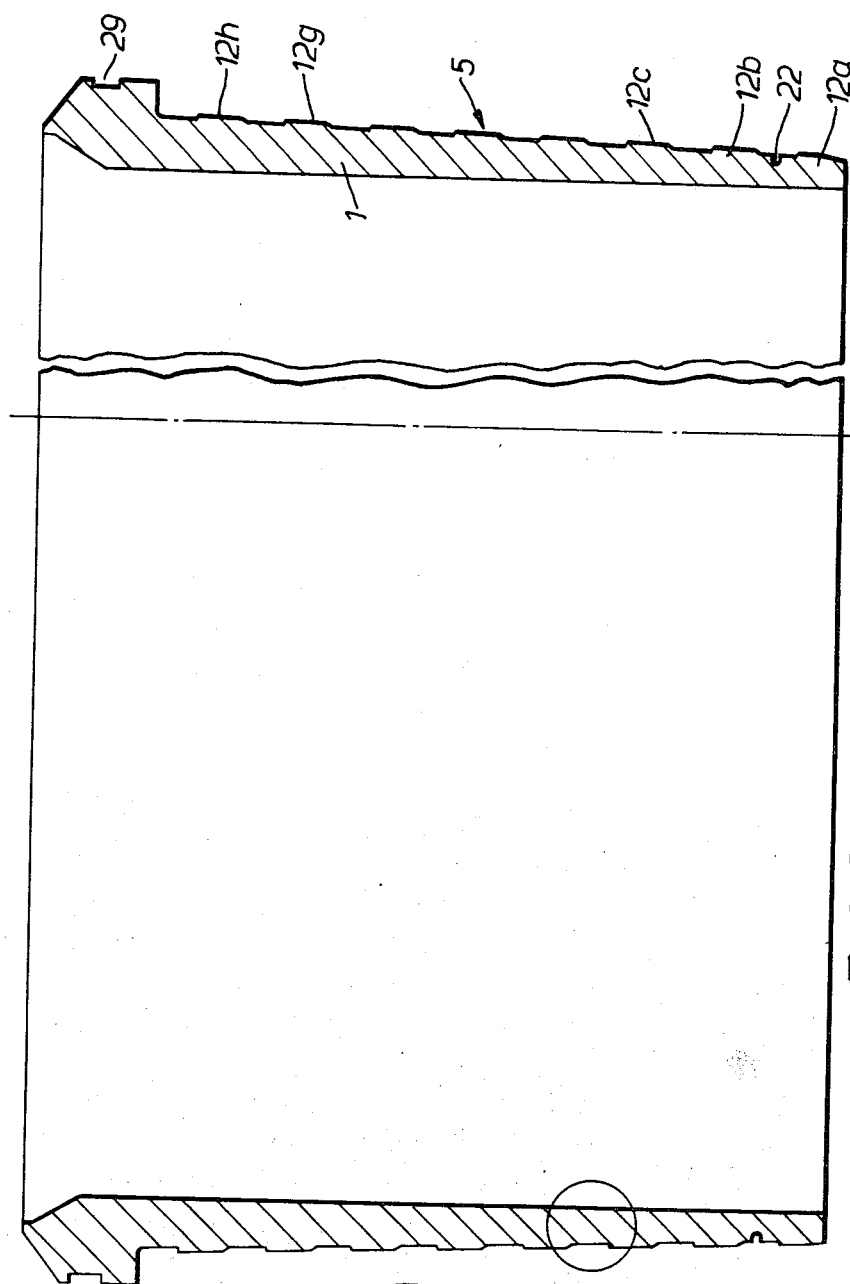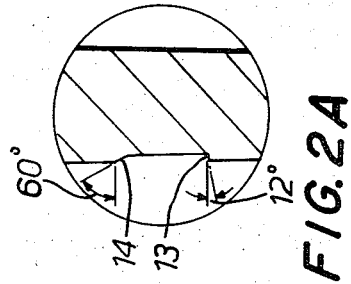

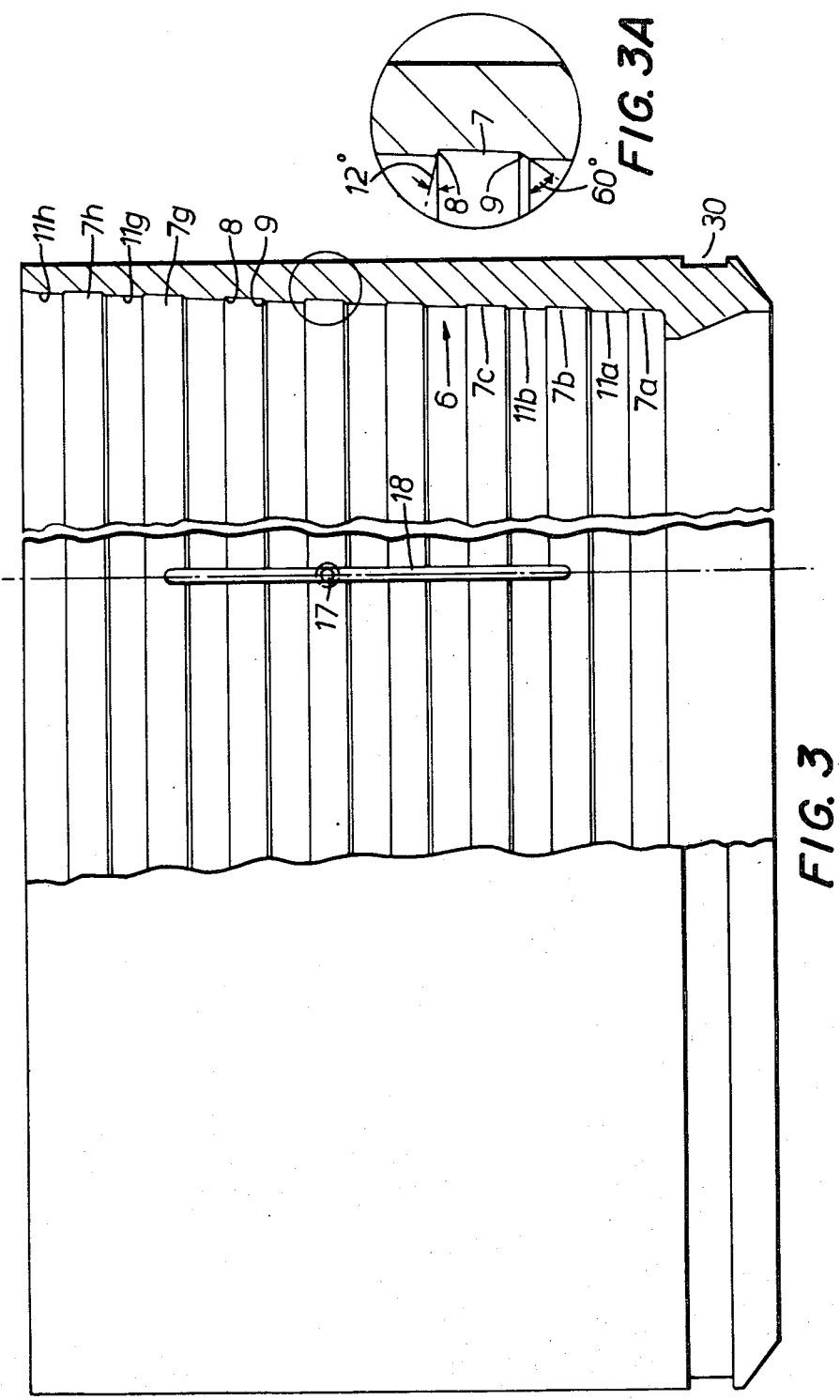

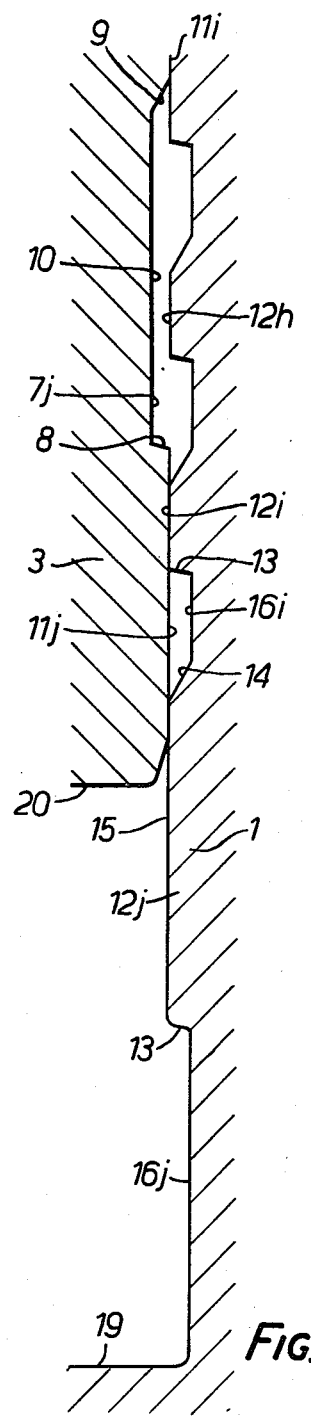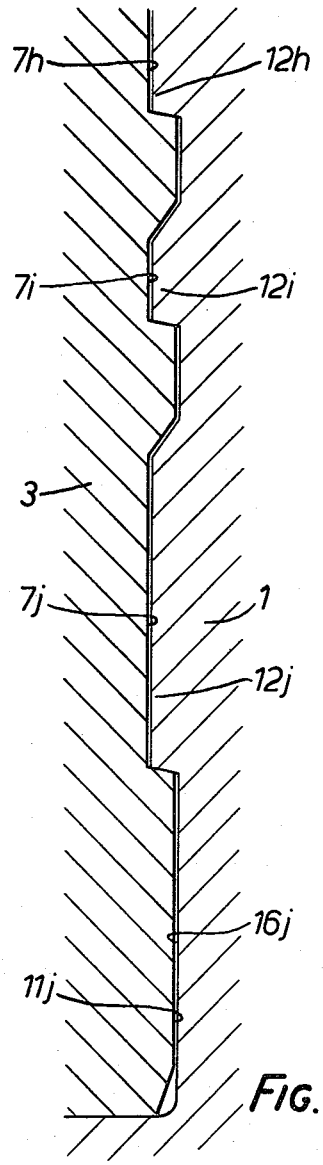
FIG. 10.
FIG. 11.

PIPE CONNECTORS

CROSS RELATED APPLICATION

This application is a continuation-in-part of Ser. No. 815,094 filed July 13, 1977 and now abandoned.

The present invention relates to improvements in pipe connectors particularly but not exclusively designed and adapted for use in connecting pipes and other tubular structures for use in the drilling and/or completion of off-shore oil and/or gas wells.

According to the present invention there is provided a pipe connector comprising:
- a tubular pin member having a frusto-conical outer peripheral surface;
- a tubular box member telescopically engageable with said pin member and having a frusto-conical inner peripheral surface corresponding to said frusto-conical surface of said pin member and which overlies said frusto-conical surface of said pin member when said members are engaged; and
- annular projection and groove means provided in said frusto-conical surfaces of said pin member and said box member and inter-engageable to axially lock said pin member and said box member together;
- said projection and groove means comprising projections and grooves having planar crest and root surfaces, being axially spaced apart along said frusto-conical surfaces, and being arranged so that, on assembly of said pin member and said box member, initial metal-to-metal contact will be made at least between said crest surface of end ones of said projections of said projection means of one of said frusto-conical surfaces and parts of the other one of said frusto-conical surfaces between adjacent grooves of said groove means and adjacent those ones of said grooves in which said respective projections are to be engaged;
- wherein the radial dimensions of said projections and grooves are such that the expansion of said box member and/or contraction of said pin member resulting from forcing each said projection into the corresponding said groove during engagement of said members does not exceed the elastic limit of the material of said box member and/or said pin member.

The present invention will be more fully understood from the following description of an embodiment thereof, given by way of example only, with reference to the accompanying drawings.

In the drawings:

FIGS. 2 and 3 are enlarged sections of the pin and box members of FIG. 1 respectively;

FIGS. 2A and 3A are respective enlarged sections of details of FIGS. 2 and 3;

FIG. 10 is an enlarged view of part of one end of the connector of FIG. 8 during engagement of the pin and box members; and FIG. 11 is a view corresponding to that of FIG. 10 showing the pin and box members when engaged.

Figure 8:
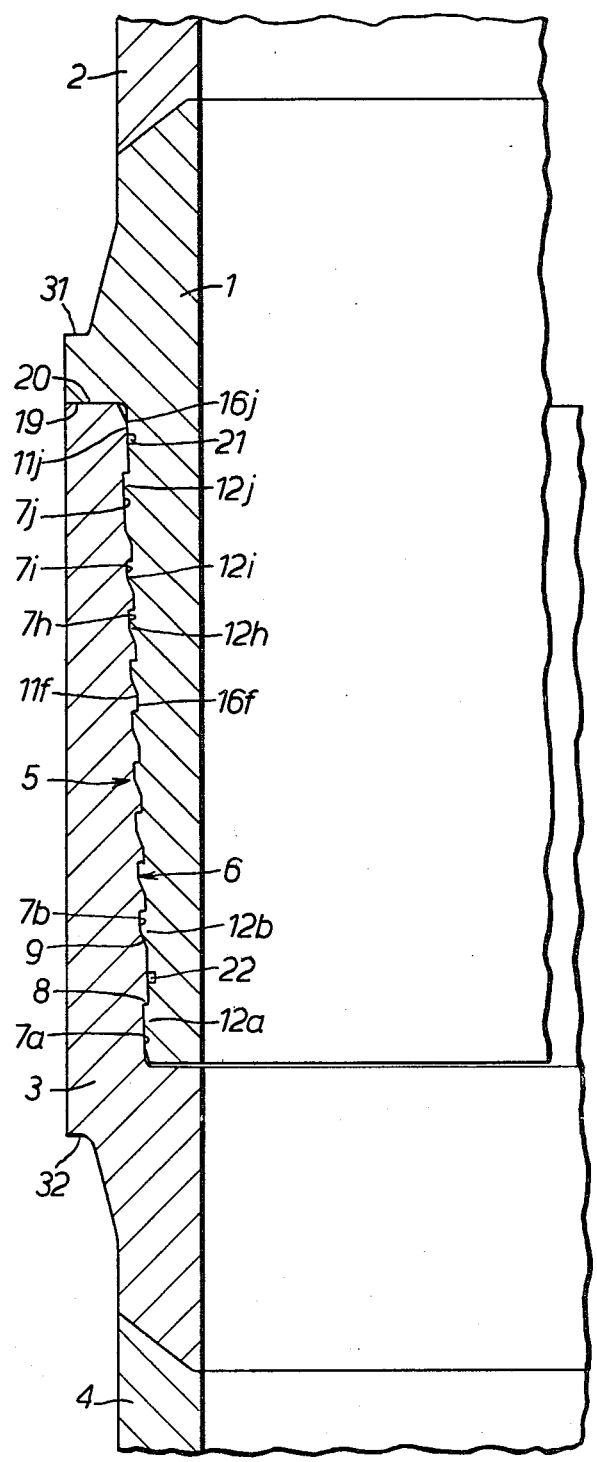
FIG. 8 is a diagrammatic sectional view showing part of another embodiment of a connector according to the invention.

The pipe connector shown in FIGS. 1 to 5 comprises a tubular pin member 1, for connection, e.g. by welding, to the end of a pipe 2, and a tubular box member 3 for connection, e.g. by welding, to the end of a pipe 4 to be connected to pipe 2. The pin and box members are telescopically engageable and have corresponding frusto-conical outer and inner peripheral surfaces 5, 6 (FIG. 8) respectively which overlie one another when the pin member 1 is fully telescoped into the box member 2.

To axially lock the pin member to the box member, the box member is provided with a plurality of circumferentially extending annular grooves 7a, 7b ... 7h, each groove extending in a radial plane and having radially extending end surfaces 8, 9 separated by root surface 10 (FIG. 10). The grooves are axially spaced apart by surfaces 11a, 11b ... 11h forming the frusto-conical surface 6. The pin member has a plurality of axially spaced circumferentially extending annular projections 12a, 12b ... 12h corresponding to the grooves 7a ... 7h, each projection having radially extending surfaces 13, 14 separated by crest surface 15, the grooves being spaced by surfaces 16a, 16b ... 16h forming the frusto-conical surface 5.

As shown, the root and crest surfaces 10, 15 lie on frusto-conical surfaces parallel to the surfaces 11, 16 so that all the projections and the grooves are of equal depth. The projections and grooves may, as shown, extend over substantially the entire extent of the surfaces 5, 6 but may extend over a lesser part of the surface.

Figure 9:
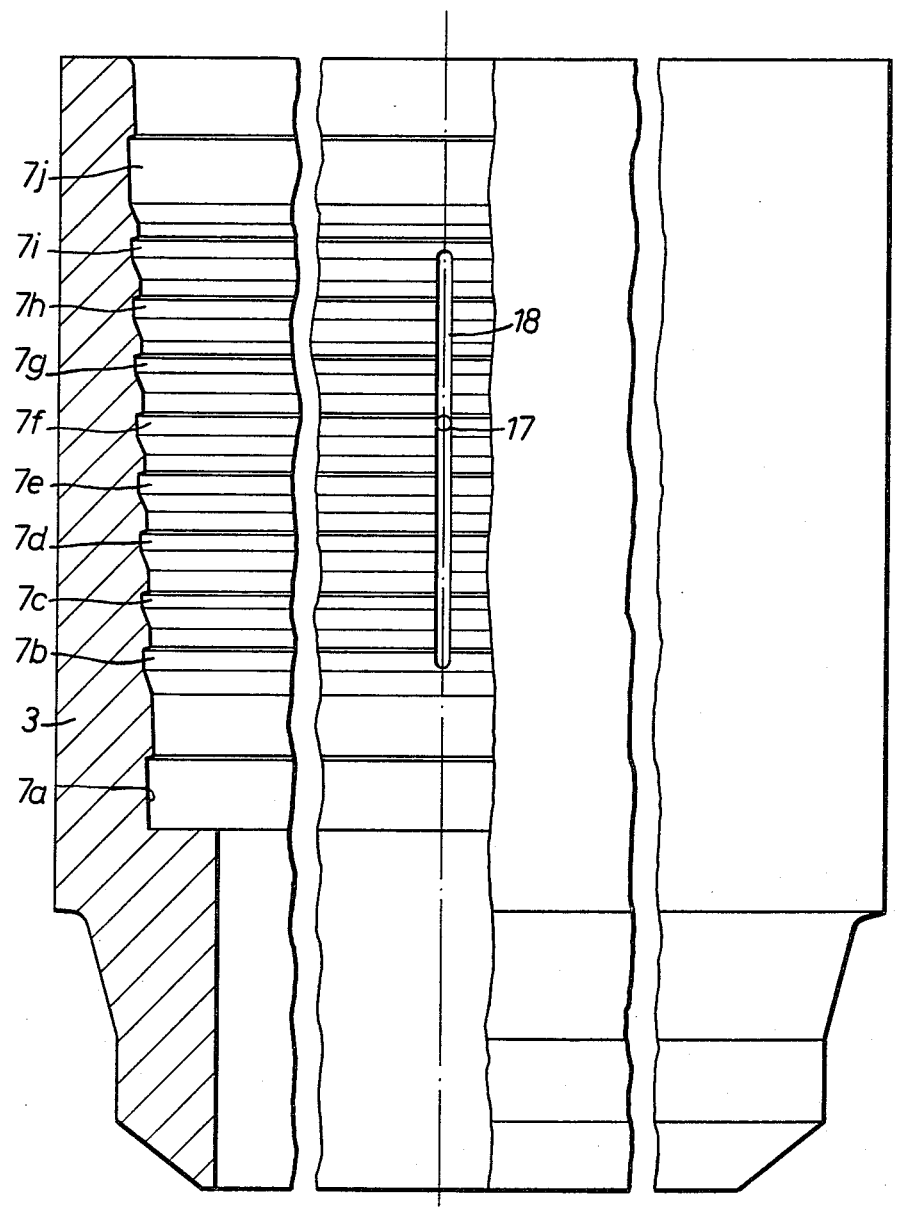
FIG. 9 is a part sectional, part side view of the box member of the connector of FIG. 8.

The box member is provided with a radial passage 17 FIG. 9 communicating with an axially extending recess 18 intersecting some of the grooves centrally of the grooved region. The passage is adapted for connection to a source of liquid, e.g. oil, under pressure, e.g. at about 175.7 to 210.9 Kg/m$^2$ where the pin and box members are made of high tensile steel.

As shown, the connector is intended to transmit compressive forces, e.g. pile driving forces, between the pipes to which it is connected and to this end the surfaces 8, 13 at one end of each projection and groove are radially extending, or extend at a small angle to the radial plane. Additionally the connector is arranged so that, when the members are engaged, these surfaces 8, 13 are in abutment. As shown this is obtained by arranging the projections and grooves so that a radial end surface 20 on the box member comes into abutment with a corresponding radial surface 19 on the pin member to create a force fit between these surfaces 19, 20 and the surfaces 8, 13. As shown, the projections and grooves are dimensioned so that there is a slight radial clearance between the other overlying surfaces 15, 16, 10, 11 and radial and axial clearance between surfaces 9, 14. In modifications, the radial clearances between the surfaces 15, 16 and 10, 11 may be omitted so that the pin member is a force fit in the box member.

Figure 1:
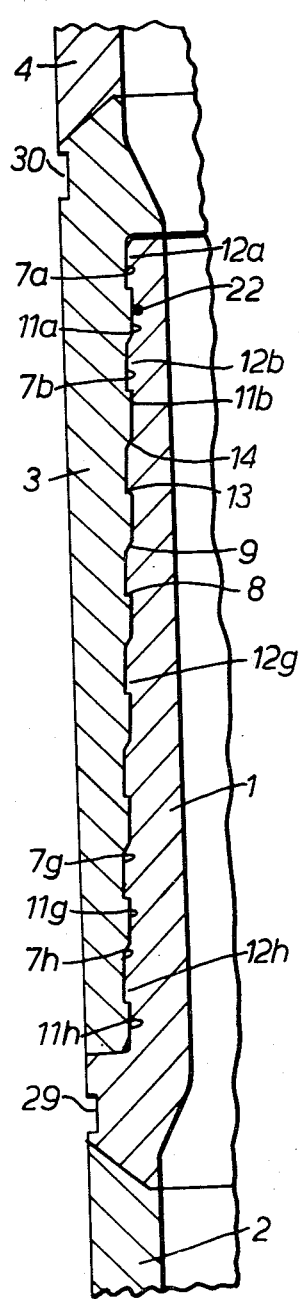
FIG. 1 is an axial section through an embodiment of a pipe connector in accordance with the present invention and showing the pin and box members assembled.
Figure 4:
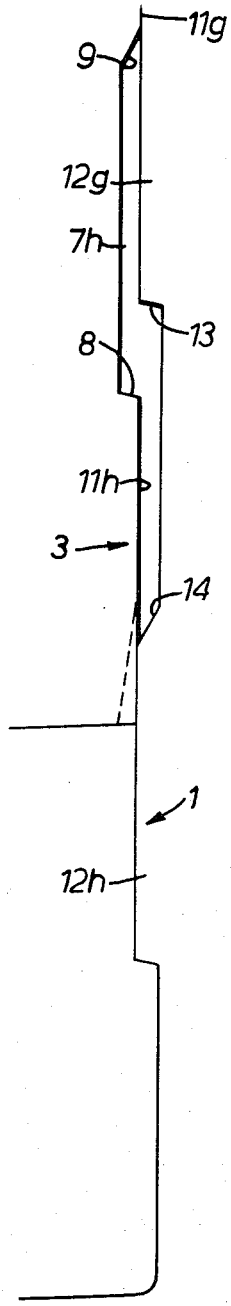
FIGS. 4 and 5 are enlarged sections showing the pin and box members of FIG. 1 during assembly and when assembled.
Figure 5:
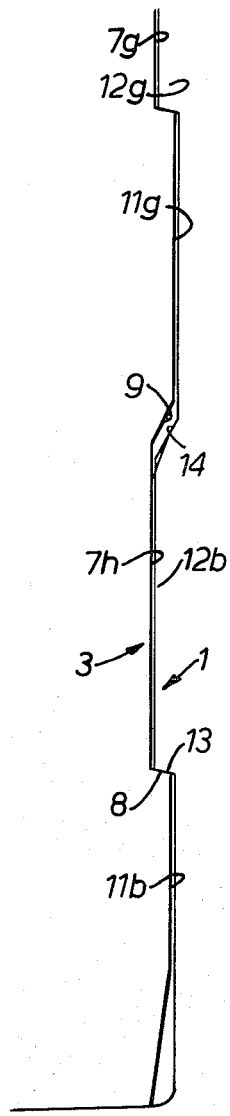

The frusto-conical surfaces 5, 6 and the grooves 7 and projections 12 are arranged and dimensioned so that, when the pin and box members are pushed together, initial metal-to-metal contact is obtained, as shown in FIG. 4, between the crest surface 15 of each projection 12 of the pin member and the surface 11 of the box member adjacent the corresponding groove 7. Once metal-to-metal contact has been made, an axial force is applied between the pin and box members to progressively bring the members together and engage the projections in the respective grooves. On application of the axial force, the box member expands and/or the pin member contracts a sufficient amount to allow each projection e.g. projection 12g, to slide over the surface, e.g. surface 11g, into the groove, e.g. groove 7g. The projection and groove depth is arranged so that in so doing, the elastic limit of the material of the pin and box members is not exceeded.

A caliper type jack 24 (FIGS. 6 and 7) may be used to apply the axial force to the members. The caliper jack consists of an upper plate 25 and a lower plate 26 each of which is split diametrically and hinged at 27 to permit each plate to be engaged around a respective one of the members. A plurality of hydraulic jacks 28 are arranged to act between the plates, the jacks being angularly spaced apart around the axis of the caliper jack. The plates 25, 26 engage in grooves 29, 39 provided in the pin and box members respectively.

During application of the axial force, it is found advantageous to apply liquid under pressure to the region of overlap between the pin and box members. It is for this reason that the passage 17 and recess 18 are provided. The liquid flows from the passage 17 to the recess 18 and then into those grooves 7 with which the recess communicates. Flow beyond these grooves 7 is initially prevented by the metal-to-metal contact between the projections 12 and surfaces 11. The pressure of the liquid is set at a level sufficient to aid expansion of the box member and/or contraction of the pin member as the members are brought together under the axial force. It is found that in effect the liquid lubricates the contacting surfaces of the pin and box member when then form a hydrostatic bearing so that metal-to-metal contact is lost. While there is consequently leakage of the liquid, the leakage is not sufficient to render the application of the liquid ineffective. The lubrication of the contacting surfaces of the pin and box member reduces the possibility of damage to the projections and grooves of the pin and box members as they are forced together.

When the pin and box members are assembled, it is found essential to ensure that no liquid is trapped in any of the grooves 7. Should any liquid be trapped, the corresponding projection will be unable to engage fully in its groove and there will then be a risk of the connector coming apart. To avoid this possibility, the recess 18 is extended to and is in communication with the two grooves 7b and 7g adjacent each end groove 7a and 7h so that the liquid in the grooves 7b to 7g can be drained through the passage 17. Any liquid remaining in the end grooves 7a and 7h can escape around the end of the pin member and box member respectively. Where the pin member is not a force fit in the box member and continuous clearances are provided between the overlying surfaces of the pin and box members, it is merely necessary to ensure that all fluid can be drained from between the overlying surfaces of the pin and box members and the precise extent of the recess 18 is not so critical but clearly it must be sufficient to aid in expansion and/or contraction of the box member and pin member respectively.

If it is required that the assembled connector be able to be disassembled, the passage 17 and recess 18 can be provided and used for this purpose. Liquid under pressure is then applied to the passage 17 and flows along the recess 18 and circumferentially in the clearances which are left between the surfaces 9, 14 of the projections and corresponding grooves which are in communication with the recess 18. The axial extent of penetration of the liquid is initially limited by the metal-to-metal contact between the projections and grooves at the ends of the recess 18. At the same time an axial disengaging force is applied to the pin and box members, e.g. using the caliper jack 14, so as to maintain metal-to-metal contact between the end surfaces 8, 13 the grooves and projections. As in the case where liquid under pressure is used in assembling the pin and box members, the liquid acts to expand the box member and/or contract the pin member to free the projections from the grooves. However, in disassembly, the applied axial force maintains the end surfaces 8 of the grooves in contact with the corresponding end surfaces 13 of the projections to prevent substantial leakage of the liquid until the projection have been disengaged from the grooves and rest on the surfaces 11 between the grooves. Further slight application of axial force will bring the pin member back to a position relative to the box member as shown in FIG. 4 corresponding to initial metal-to-metal contact during assembly.

Seals may be provided in one or both of the surfaces 5, 6 of the pin and box members at the ends of these surfaces to assist prevention of leakage of liquid from between the members during assembly and disassembly and in use. If such seals are provided, one or more of the projections and grooves at the ends of the members may be omitted. However, if the pin and box members are suitably relatively dimensioned, sealing by metal-to-metal contact between the pin and box members may be solely relied on and no other seals provided. As shown an O ring seal 22 is provided in the surface of the pin members adjacent the end tooth 12a to provide additional sealing when the coupling is in use.

In a preferred embodiment, the pin and box members are made of high tensile steel and have external and internal diameters of about 71.12 cms. The conicity of the frusto-conical surfaces is 2°, each tooth has a height of 0.12 cm and a length at its base of 2.0 cms. Each groove has a depth of 0.11 cm and a length at the surface of 2.13 cm. Eight teeth and grooves are provided in each frusto-conical surface and are spaced 3.81 cm apart in the axial direction. The end surface 8 of each groove and the corresponding surface 13 of each projection has a taper of 12° to a plane perpendicular to the axis of the pin and box members and the surface 9 of each groove and the corresponding surface 14 of each projection has a taper of 60°. The former taper is determined by the tolerances of manufacture and is the angle required to ensure a tight fit between opposed surfaces, as shown, at the inner end of the pin member and the free end of the box member, or at the free end of the pin member and the inner end of the box member, for force transmitting, e.g. for pile driving.

In the above described embodiment, the projections and grooves of the frusto-conical surfaces 5, 6 are substantially equally axially spaced apart along the axial length of the frusto-conical surfaces and of equal axial extent. The pin and box members are dimensioned so that when they are pushed together each projection 12 comes into metal-to-metal contact with the frusto-conical surface 11 upstream of its groove 7 so that the projection 12 has merely to slide over the surface 11 into its groove 7.

It will be appreciated that it is necessary to provide this metal-to-metal contact between all the projections and grooves if liquid under pressure is provided to assist in forcing the pin and box members together. Metal-to-metal sealing contact is required at each end of the frusto-conical surfaces.

The projections and grooves can therefore have a lesser axial extent and spacing than the end projections and grooves. Such a connector is shown in FIGS. 8 to 11 in which parts corresponding to equivalent parts in the connector of FIGS. 1 to 5 have been designated by the same reference numerals. The minimum axial extent and spacing of the intermediate projections and grooves must merely be such that there is sufficient metal behind each of the force transmitting surfaces 8, 13 that the surfaces can withstand the force to be applied thereto. It is found that this requirement produces intermediate protection and grooves which have substantially smaller axial extent of spacing than in the foregoing embodiment so that the overall length of the frusto-conical surfaces can be substantially reduced with a substantial reduction in the material in the pin and box members and therefore a substantial cost saving. As shown, the intermediate projections and grooves have approximately half the axial extent and spacing of the end projections and grooves which produces a connector which is less than half the length of a connector as described with reference to FIGS. 1 to 5 when considering connectors for transmitting the same axial force and therefore requiring the same number of force transmitting surfaces 8, 13 of the same radial extent.

The connector is assembled in an exactly similar way to that of FIGS. 1 to 5, except that, as a consequence of this reduction in axial extent of the intermediate projections and grooves, during assembly of the members and after initial metal-to-metal contact has been made between the end projections and the surfaces upstream of the end grooves, an intermediate projection may, as shown, have to be moved past one or more grooves upstream of its corresponding groove. To assist movement of a projection out of the groove and onto the downstream surface separating the grooves, the end surfaces 14 of the grooves and the corresponding end surfaces 9 of the projections are inclined at a relatively small angle to the axis.

Figure 6:
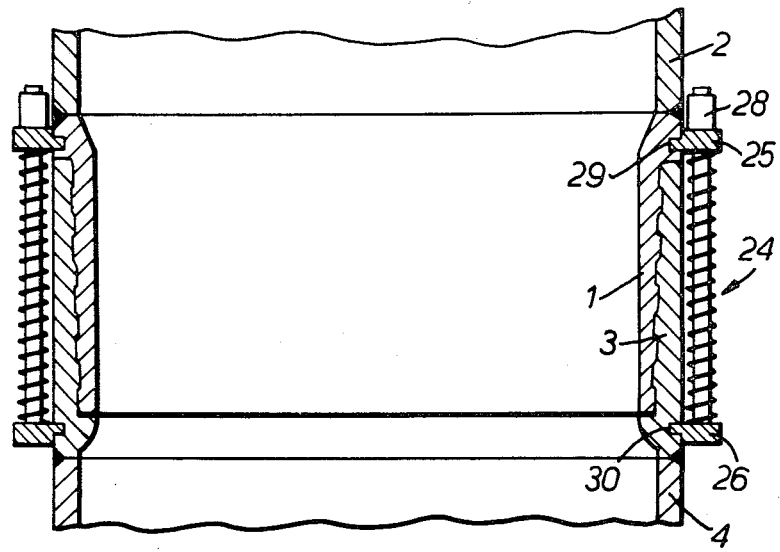
FIG. 6 is an axial section through the connector of FIG. 1 showing means for applying an axial assembling force thereto.
Figure 7:
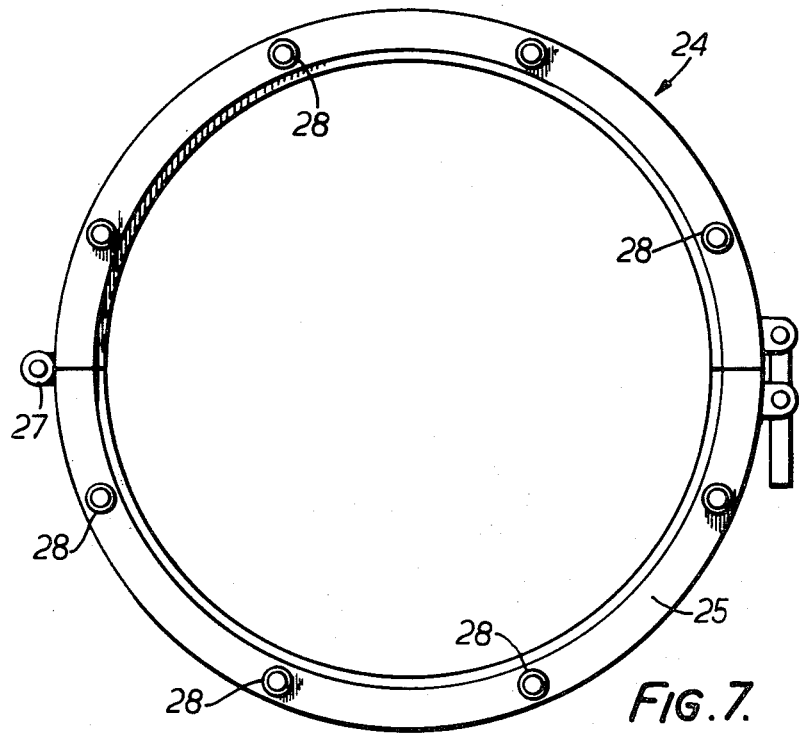
FIG. 7 is a plan view of the force apply means of FIG. 6.

As in the previous embodiment, the axial assembling force may be applied by apparatus as shown in FIGS. 6 and 7, the plates 25, 26 bearing against surfaces 31, 32 on the pin and box members.

In a preferred embodiment, according to FIGS. 8 to 11, the pin and box members are made of high tensile steel and have external and internal diameters of approximately 71 cm. The conicity of the frusto-conical surfaces 5, 6 and of the roots and crests of the grooves and projections is 2°. Each projection has a height of 0.122 cm and each groove has a depth of 0.112 cm. The end grooves have a length at the surface of 2.133 cm and the end projections have a length at their base of 2.032 cm. The surfaces upstream of the end projections and grooves are correspondingly dimensioned. The intermediate grooves and projections may have, for example, half the dimensions of the end grooves and projection so that the overall length of the frusto-conical surfaces of the members is 12.70 cm with an overall connector length of 24.13 cm. This compares with a corresponding connector as described in application no. 3227/77 which would have a frusto-conical surface length of about 42 cm and an overall length of about 53 cm.

The force transmitting surfaces 8, 13 of the projections and grooves preferably are inclined at 12° to the radial plane and the other end faces 9, 14 may be inclined at an angle of 75° to the radial plane.

It will be appreciated that, with either of the above connectors, by using a different angle for the conicity of the frusto-conical surfaces of the pin and box members, and different materials for the pin and box members, the foregoing dimensions and numbers of the projections and grooves may be varied, in dependence on the forces to be transmitted by the connector.

It will also be appreciated that the number of projections provided and the area of their force transmitting surfaces is determined in dependence on the force to be transmitted. Thus the connector of FIG. 8, having 10 projections is capable of transmitting a greater force than the connector of FIG. 1, assuming that the other dimensions of the connectors are equal.

It will further be appreciated that, while the above described connectors have been described in terms of projections provided on the pin member and grooves provided in the box member, this is exactly equivalent to the provision of grooves in the pin member and projections in the box member. Indeed, while the surfaces 13, 14 and 15 have been described as defining a projection on the pin member, the surfaces 13, 14 and 16 could equally be described as providing a groove on the pin member with the corresponding surfaces on the box member providing an exactly similar projection.

There are thus provided pipe connectors which have a simple construction, are easy to assemble and do not rely on moving parts to ensure interengagement between the pin and box members.

Should either of the above described connectors be required to transmit torque, as well as compressive forces, an inwardly projecting pin may be provided at the inner end of the frusto-conical surface of the box member for engagement in a recess provided in the leading edge of the pin member.

What is claimed is:
1. A pipe connector comprising:
    a tubular pin member having a generally frusto-conical outer peripheral surface;
    a tubular box member telescopically engageable with said pin member and having a generally frusto-conical inner peripheral surface corresponding to said frusto-conical surface of said pin member and which overlies said frusto-conical surface of said pin member when said members are engaged; and
    annular projection and groove means provided in said frusto-conical surfaces of said pin member and said box member, extending circumferentially thereof and interengageable to axially lock said pin member and said box member together;
    said projection and groove means comprising projections and grooves having crest and root surfaces, being equally axially spaced apart along said frusto-conical surfaces, and having equal axial extents and being arranged so that, on assembly of said pin member and said box member, initial metal-to-metal force fit contact will be made between said crest surfaces of all said projections of said projec- tion means of one of said frusto-conical surfaces and parts of the other of said frusto-conical surfaces between said groove means and adjacent the one of said grooves in which the respective projection is to be engaged;

wherein the radial dimensions of said projections and grooves in such that the expansion of said box member and/or contraction of said pin member resulting from forcing each said projection into the corresponding said groove during engagement of said members does not exceed the elastic limit of the material of said box member and/or said pin member; and said pin member and said box member are arranged so that surfaces thereof engage one another in abutting force fit engagement when said pin member and said box member are fully interengaged.

2. A pipe connector comprising:
a tubular pin member having a frusto-conical outer peripheral surface;
a tubular box member telescopically engageable with said pin member and having a frusto-conical inner peripheral surface corresponding to said frusto-conical surface of said pin member and which overlies said frusto-conical surface of said pin member when said members are engaged; and
annular projection and groove means provided in said frusto-conical surfaces of said pin member and said box member and interengeable to axially lock said pin member and said box member together;
said projection and groove means comprising projections and grooves having crest and root surfaces, being axially spaced apart along said frusto-conical surfaces and being arranged so that, on assembly of said pin member and said box member, initial metal-to-metal force fit contact will be made at least between said crest surfaces of end ones of said projections of said projection means of one of said frusto-conical surfaces and parts of the other one of said frusto-conical surfaces adjacent grooves of said groove means in which said respective projections are to be engaged;
wherein the ones of said projections and grooves intermediate said end projections and grooves have axial extents and spacings less than those of said end projections and grooves;
the radial dimensions of said projections and grooves are such that the expansion of said box member and/or contraction of said pin member resulting from forcing each said projection into the corresponding said groove during engagement of said members does not exceed the elastic limit of the material of said box member and/or said pin member; and
said pin member and said box member are arranged so that surfaces thereof engage one another in abutting force fit engagement when said pin member and said box member are fully interengaged wherein said box member is provided with a radial passage for connection to a supply of fluid under pressure, said passage communicating with an axially extending groove in said frusto-conical surface of said box member, said groove extending centrally of the region provided with said projection and groove means of said assembled pin and box members, for communicating fluid under pressure to said projection and groove means for causing expansion of said box member and/or contraction of said pin member for assisting in the assembly and/or disassembly of said connector, said initial metal-to-metal contact between said crest surfaces providing sealing for the fluid.

3. A pipe connector as claimed in claim 1 or 2, wherein said angle of conicity of said frusto-conical surfaces is of the order of 2°.

4. A pipe connector as claimed in claim 1 or 2, wherein said pin and box members are adapted for connection to means for applying an axial force thereto for assisting in assembly of the connector.

5. A pipe connector comprising:
a tubular pin member having a generally frusto-conical outer peripheral surface;
a tubular box member telescopically engageable with said pin member and having a generally frusto-conical inner peripheral surface corresponding to said frusto-conical surface of said pin member and which overlies said frusto-conical surface of said pin member when said members are engaged; and
annular projection and groove means provided in said frusto-conical surfaces of said pin member and said box member, extending circumferentially thereof and interengageable to axially lock said pin member and said box member together;
said projection and groove means comprising a plurality of axially spaced annular grooves in said frusto-conical surface of one of said members, said grooves being equally axially spaced apart and having equal axial extents along said frusto-conical surface in said one member and each being defined by a pair of spaced radially extending end surfaces interconnected by a root surface and a plurality of equally axially spaced annular projections in said frusto-conical surface of the other one of said members and corresponding to said grooves of said one member, each said projection being defined by a pair of spaced radially extending end surfaces corresponding to end surfaces of said grooves and interconnected by a crest surface;
wherein the radial dimensions of said projections and said grooves are such that the expansion of said box member and/or contraction of said pin member resulting from forcing each said projection into the corresponding said groove during engagement of said members does not exceed the elastic limit of the material of said box member and/or said pin member; and
said pin member and said box member have additional radially extending surfaces which are abutted when said pin member and said box member are fully interengaged, which additional radially extending surfaces are spaced relative to said radially extending end surfaces of said grooves and projections so that said radially extending end surfaces at one of the ends of said grooves and projections engage one another in abutting force fit engagement when said pin member and said box member are fully interengaged.

6. A pipe connector comprising:
a tubular pin member having a generally frusto-conical outer peripheral surface;
a tubular box member telescopically engageable with said pin member and having a generally frusto-conical inner peripheral surface corresponding to said frusto-conical surface of said pin member and which overlies said frusto-conical surface of said pin member when said members are engaged; and annular projection and groove means provided in said frusto-conical surfaces of said pin member and said box member, extending circumferentially thereof and interengageable to axially lock said pin member and said box member together;

said projection and groove means comprising a plurality of axially spaced annular grooves in said frusto-conical surface of one of said members, each said groove being defined by a pair of spaced radially extending end surfaces interconnected by a root surface; and a plurality of axially spaced annular projections in said frusto-conical surface of the other of said members and corresponding to said grooves of said one member, each said projection being defined by a pair of spaced radially extending end surfaces corresponding to said end surfaces of said grooves and interconnected by a crest surface;

wherein the projections and grooves include end projections and grooves and intermediate projections and grooves between said end projections and grooves, said intermediate projections and grooves having axial extents and spacings less than those of said end projections and grooves;

the radial dimensions of said projections and grooves are such that the expansion of said box member and/or contraction of said pin member resulting from forcing each said projection into the corresponding said groove during engagement of said members does not exceed the elastic limit of the material of said box member and/or said pin member; and said pin member and said box member have additional radially extending surfaces which are abutted when said pin member and said box member are fully interengaged, which additional radially extending surfaces are spaced relative to said radially extending end surfaces of said grooves and projections so that said radially extending end surfaces at one of the ends of said grooves and projections engage one another in abutting force fit engagement when said pin member and said box member are fully interengaged.

7. A pipe connector as claimed in claim 1 or 6, wherein said box member is provided with a radial passage for connection to a supply of fluid under pressure, said passage communicating with an axially extending groove in said frusto-conical surface of said box member, said groove extending centrally of the region provided with said projection and groove means of said assembled pin and box members, for communicating fluid under pressure to said projection and groove means for causing expansion of said box member and/or contraction of said pin member for assisting in the assembly and/or disassembly of said connector, said initial metal-to-metal contact between said crest surfaces providing sealing for the fluid.

8. A pipe connector as claimed in claim 7, wherein said axially extending groove extends axially to communicate with that groove in said box member adjacent each said end groove at each end of said frusto-conical surface thereof.

9. A pipe connector as claimed in claim 2 or 6, wherein the axial extents and spacings of said intermediate projections and grooves is such that, after initial metal-to-metal contact is made, said intermediate projections are spaced axially from the corresponding ones of said grooves by more than the axial extent and spacing of one said groove.

10. A pipe connector as claimed in claim 5 or 6, wherein said angle of conicity of said frusto-conical surfaces is of the order of 2°.

11. A pipe connector as claimed in claim 10, wherein said box member is provided with a radial passage for connection to a supply of fluid under pressure, said passage communicating with an axially extending groove in said frusto-conical surface of said box member, said groove extending centrally of the region provided with said projection and groove means of said assembled pin and box members, for communicating fluid under pressure to said projection and groove means for causing expansion of said box member and/or contraction of said pin member for assisting in the assembly and/or disassembly of said connector, said initial metal-to-metal contact between said crest surfaces providing sealing for the fluid.

12. A pipe connector as claimed in claim 11, wherein said axially extending groove extends axially to communicate with that groove in said box member adjacent the end groove at each end of said frusto-conical surface thereof.

* * * * *